(12) United States Patent
Hattori

(10) Patent No.: US 12,122,940 B2
(45) Date of Patent: Oct. 22, 2024

(54) BOARD MATERIAL PROCESSING COMPOSITION, BOARD MATERIAL LAMINATE, AND METHOD FOR MANUFACTURING BOARD MATERIAL LAMINATE

(71) Applicant: M&H Technical Research Institute Co., LTD., Tokyo (JP)

(72) Inventor: Toshinori Hattori, Tokyo (JP)

(73) Assignee: M&H Technical Research Institute Co., LTD., Tokyo (JP)

( * ) Notice: Subject to any disclaimer, the term of this patent is extended or adjusted under 35 U.S.C. 154(b) by 0 days.

(21) Appl. No.: 18/555,049

(22) PCT Filed: Mar. 30, 2022

(86) PCT No.: PCT/JP2022/016238
§ 371 (c)(1),
(2) Date: Oct. 12, 2023

(87) PCT Pub. No.: WO2022/224782
PCT Pub. Date: Oct. 27, 2022

(65) Prior Publication Data
US 2024/0124718 A1 Apr. 18, 2024

(30) Foreign Application Priority Data
Apr. 23, 2021 (JP) ................. 2021-073498

(51) Int. Cl.
*C09D 5/18* (2006.01)
*B27D 1/04* (2006.01)
(Continued)

(52) U.S. Cl.
CPC .............. *C09D 5/18* (2013.01); *B27D 1/04* (2013.01); *B27K 3/20* (2013.01); *B27K 3/32* (2013.01);
(Continued)

(58) Field of Classification Search
None
See application file for complete search history.

(56) References Cited

U.S. PATENT DOCUMENTS

| 4,168,175 A | 9/1979 | Shutt |
|---|---|---|
| 4,666,960 A | 5/1987 | Spain |

(Continued)

FOREIGN PATENT DOCUMENTS

| CN | 101121274 A | * | 2/2008 |
|---|---|---|---|
| CN | 102493829 A | | 6/2012 |

(Continued)

OTHER PUBLICATIONS

Examination Report for corresponding Australian Patent Application No. 2022262491, mailed Nov. 10, 2023.
(Continued)

*Primary Examiner* — Tae H Yoon
(74) *Attorney, Agent, or Firm* — GRUMBLES LAW PLLC; Brittany Haanan

(57) ABSTRACT

To provide a board material processing composition allowing for production of a board material laminate that is non-combustible and is excellent in adhesion performance. In order to solve this problem, a board material processing composition inhibiting combustion of a board material due to heating, comprises: a carbonization promotion component, being inorganic, promoting carbonization of an organic component within the board material at the heating; a chain inhibition component, being inorganic, inhibiting a reaction chain to a neighboring component due to a product of endothermic decomposition generated at the heating; and binder particles, being inorganic and hydrophobic, bonding the organic component within the board material to the carbonization promotion component and the chain inhibition component, wherein the carbonization promotion component includes boric acid, the chain inhibition component (Continued)

includes ammonium dihydrogen phosphate, and the binder particles include silica sand.

15 Claims, 4 Drawing Sheets

(51) Int. Cl.
| | |
|---|---|
| *B27K 3/20* | (2006.01) |
| *B27K 3/32* | (2006.01) |
| *B32B 21/04* | (2006.01) |
| *B32B 21/13* | (2006.01) |
| *B32B 21/14* | (2006.01) |
| *C09D 1/00* | (2006.01) |
| *C09D 5/14* | (2006.01) |
| *C09D 5/16* | (2006.01) |
| *C09D 7/40* | (2018.01) |
| *C09D 7/61* | (2018.01) |
| *C09D 191/06* | (2006.01) |
| *C08K 3/013* | (2018.01) |
| *C08K 3/015* | (2018.01) |
| *C08K 3/36* | (2006.01) |

(52) U.S. Cl.
CPC ............ *B32B 21/042* (2013.01); *B32B 21/13* (2013.01); *B32B 21/14* (2013.01); *C09D 1/00* (2013.01); *C09D 5/14* (2013.01); *C09D 5/16* (2013.01); *C09D 5/185* (2013.01); *C09D 7/61* (2018.01); *C09D 7/69* (2018.01); *C09D 7/70* (2018.01); *C09D 191/06* (2013.01); *B27K 2240/30* (2013.01); *B32B 2255/08* (2013.01); *B32B 2255/26* (2013.01); *B32B 2255/28* (2013.01); *B32B 2260/026* (2013.01); *B32B 2260/046* (2013.01); *B32B 2307/3065* (2013.01); *B32B 2307/7376* (2023.05); *B32B 2419/00* (2013.01); *C08K 3/013* (2018.01); *C08K 3/015* (2018.01); *C08K 3/36* (2013.01)

(56) References Cited

U.S. PATENT DOCUMENTS

| 4,810,741 A | 3/1989 | Kim |
| 2005/0229809 A1 | 10/2005 | Lally |
| 2009/0320717 A1 | 12/2009 | Adams |

FOREIGN PATENT DOCUMENTS

| CN | 104669385 A | * | 6/2015 |
| CN | 105948602 A | | 9/2016 |
| CN | 106147448 A | | 11/2016 |
| CN | 106368335 A | | 2/2017 |
| CN | 107188509 A | | 9/2017 |
| CN | 108641393 A | | 10/2018 |
| CN | 111002426 A | | 4/2020 |
| CN | 109591134 A | | 6/2021 |
| CN | 109896830 A | | 9/2021 |
| JP | S4997029 A | | 9/1974 |
| JP | S51127596 A | | 11/1976 |
| JP | S51146794 A | | 12/1976 |
| JP | S51136809 B | | 9/1982 |
| JP | H02116505 A | | 5/1990 |
| JP | H04161688 | | 6/1992 |
| JP | H0699407 A | | 4/1994 |
| JP | 2006182024 A | | 7/2006 |
| JP | 2012081603 A | | 4/2012 |
| JP | 2014087961 A | | 5/2014 |
| KR | 20120116254 A | | 10/2012 |
| KR | 1791409 B1 | * | 11/2017 |
| KR | 20190129853 A | * | 11/2019 |

OTHER PUBLICATIONS

Office Action pertaining to corresponding U.S. Appl. No. 18/520,889, mailed Feb. 27, 2024.
International Search Report and Written Opinion pertaining to PCT/JP2022/016238, mailed Jun. 7, 2022.
Notice of Grant for corresponding Japanese Patent Application No. 2023-123360, mailed Sep. 15, 2023.
Notice of Grant for corresponding Japanese Patent Application No. 2023-516407, mailed Jul. 3, 2023.
Notice of Reasons for Refusal for corresponding Japanese Patent Application No. 2023-123360, mailed Aug. 18, 2023.
Notice of Reasons for Refusal for corresponding Japanese Patent Application No. 2023-516407, mailed Jun. 9, 2023.
Examination Report pertaining to corresponding Australian Patent Application No. 2024201247, dated Mar. 28, 2024.
Examination Report pertaining to corresponding Australian Patent Application No. 2024201248, dated Apr. 2, 2024.
Filter Solutions, "Mesh to micron conversion chart", date accessed: May 15, 2024 (Year: 2024).
Final Rejection pertaining to corresponding U.S. Appl. No. 18/520,889, dated May 20, 2024.

* cited by examiner

BOARD MATERIAL PROCESSING COMPOSITION, BOARD MATERIAL LAMINATE, AND METHOD FOR MANUFACTURING BOARD MATERIAL LAMINATE

CROSS-REFERENCE TO RELATED APPLICATIONS

This is a 371 of International Application PCT/JP2022/016238, with an international filing date of Mar. 30, 2022 and titled BOARD MATERIAL PROCESSING COMPOSITION, BOARD MATERIAL LAMINATE, AND METHOD FOR MANUFACTURING BOARD MATERIAL LAMINATE, which claims priority to J.P. Application No. 2021-073498, filed Apr. 23, 2021 and titled BOARD MATERIAL PROCESSING COMPOSITION, BOARD MATERIAL LAMINATE, AND METHOD FOR MANUFACTURING BOARD MATERIAL LAMINATE.

TECHNICAL FIELD

The present disclosure relates to a board material processing composition, a board material laminate, and a method for manufacturing the board material laminate.

BACKGROUND ART

Wood used for residential buildings or the like in Japan is required to have, for example, "non-combustibility" (including quasi-non-combustibility and flame retardance, and the same applies hereinafter) under Japanese laws. The technique described in Patent Literature 1 is known as a technique to provide non-combustibility to wood. Paragraph 0009 of Patent Literature 1 describes "(1) First, polyphosphoric acid is added to hot water at 50° C. or higher. (2) After the polyphosphoric acid is completely dissolved, diammonium phosphate is added to the resulting solution and is dissolved by stirring while the temperature is maintained constant. (3) After the diammonium phosphate is dissolved, boric acid is added to the resulting solution and is dissolved by stirring, while the temperature is maintained constant. (4) Then, phosphoric acid is added to and dissolved in the resulting solution. A fire-proofing agent for wood is thus prepared."

CITATION LIST

Patent Literature

Patent Literature 1: JP2012-81603A

SUMMARY OF INVENTION

Technical Problem

In the case of a wood board (a board material) thicker than 15 mm, for example, the process to provide non-combustibility by impregnating the board material with a chemical agent has difficulty in fully impregnating the inside of the board material with the chemical agent. To address this, multiple thin board materials impregnated with a chemical agent may be laminated using an adhesive to produce thick wood as a board material laminate. However, the inventor's examination has revealed that conventional techniques cannot guarantee the adhesion performance between board materials by an adhesive and the board materials tend to delaminate over time.

An object to be achieved by the present disclosure is to provide a board material processing composition allowing for production of a board material laminate that is non-combustible and is excellent in adhesion performance, the board material laminate, and a method for manufacturing the board material laminate.

Solution to Problem

A board material processing composition inhibiting combustion of a board material due to heating, comprising: a carbonization promotion component, being inorganic, promoting carbonization of an organic component within the board material at the heating; a chain inhibition component, being inorganic, inhibiting a reaction chain to a neighboring component due to a product of endothermic decomposition generated at the heating; and binder particles, being inorganic and hydrophobic, bonding the organic component within the board material to the carbonization promotion component and the chain inhibition component, wherein the carbonization promotion component includes boric acid, the chain inhibition component includes ammonium dihydrogen phosphate, and the binder particles include silica sand. The other solutions are described later in DESCRIPTION OF EMBODIMENTS.

Advantageous Effects of Invention

According to the present disclosure, it is possible to provide a board material processing composition allowing for production of a board material laminate that is non-combustible and is excellent in adhesion performance, the board material laminate, and a method for manufacturing the board material laminate.

DESCRIPTION OF EMBODIMENTS

Figure 1:
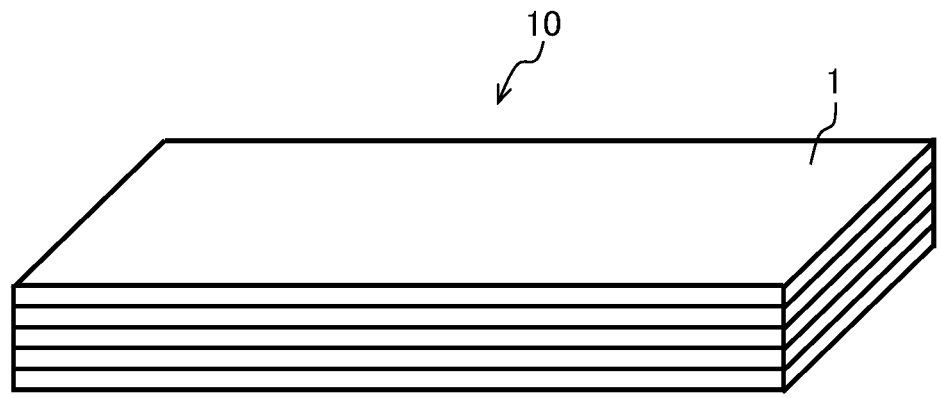
FIG. 1 is a perspective view of a board material laminate of the present disclosure.

Hereinafter, modes (referred to as embodiments) for carrying out the present disclosure will be described with reference to the drawings. In the following description of one embodiment, another embodiment applicable to the one embodiment will be properly described. The present disclosure is not particularly limited to the embodiments below and may be implemented by combining different embodiments or by optionally altering the embodiments without significantly diminishing the effect of the present disclosure. Identical members are indicated by identical reference numerals, and overlapping description is omitted. Furthermore, members including the same function are given the same name. The illustration is just schematic. For convenience of illustration, the contents of illustration can be different from actual configurations without significantly diminishing the effect of the present disclosure. Alternatively, some members are omitted in some drawings or are illustrated differently between drawings.

Figure 2:
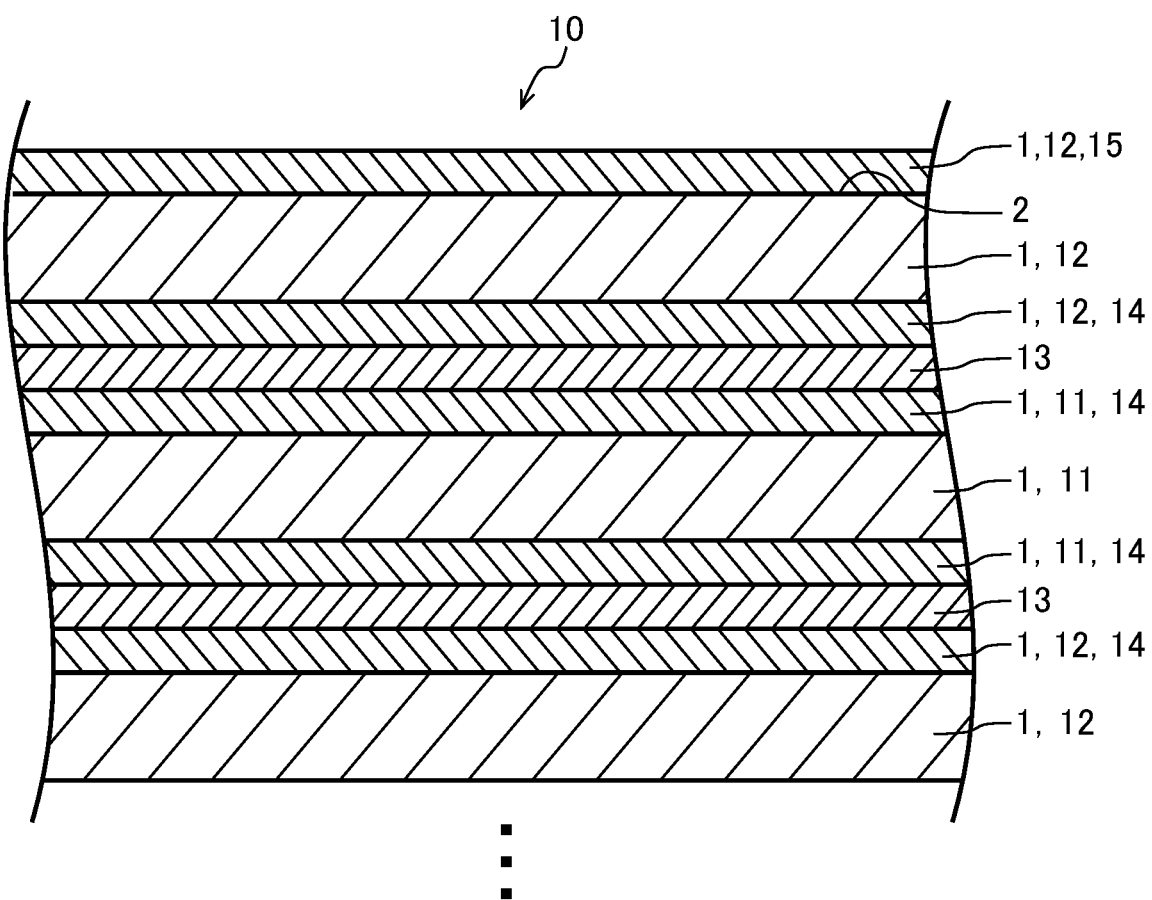
FIG. 2 is a cross-sectional view of the board material laminate of the present disclosure.

FIG. 1 is a perspective view of a board material laminate 10 of the present disclosure. FIG. 2 is a cross-sectional view of the board material laminate 10 of the present disclosure. The board material laminate 10 includes first board materials 11 and second board materials 12 as board materials 1 and adhesion layers 13. The board material laminate 10 is composed of the first board materials 11 and the second board materials 12 alternately laminated. The first board materials 11 and the second board materials 12 are bonded to each other through the adhesion layers 13.

The first and second board materials 11 and 12 are wood boards (that is, board materials) impregnated with a board material processing composition. The board material processing composition is a composition that inhibits combustion of the board materials 1 due to heating and improves the adhesive performance between the first and second board materials 11 and 12.

Each board material 1 preferably includes holes 20 (FIG. 4) in the surface. Including the hole 20 makes it easy to fully impregnate the inside of the board material 1 with the board material processing composition, thus improving the non-combustible performance of the board material laminate 10. The board material processing composition is normally slurry, such as in the case where the board material processing composition includes ceramic particles (described later) in particular. Including the holes 20 therefore makes it possible to fully impregnate the inside of the board material 1 with the slurry-type board material processing composition.

The holes 20 may have a circular shape, a rectangular shape, or another shape, for example, and may be arranged in a scattered manner, for example, in a top view of the board material 1 from the opening side of the holes 20. The holes 20 may include a groove extending in a linear or curved manner from one direction to the other direction, for example. In the scattered arrangement, the holes 20 may be regularly arranged at equal intervals or may be arranged only in any portion of the board material 1. In terms of promoting impregnation with the board material processing composition, preferably, holes 20 are arranged, at least, at such positions as to penetrate through latewood. This is described in detail later. The holes 20 may be formed in at least one of the six faces constituting the board material 1. Specifically, the holes 20 can be formed in a face (normally four faces) of the board material 1 other than the faces on which the adhesion layers 13 (described later) are disposed, for example. The holes 20 are preferably formed in such a face that the holes 20 have less impact on the designability of the board material laminate 10.

The holes 20 are provided in a flat grain face of the board material 1, for example. When the holes 20 are provided in a flat grain face, the inside of the board material 1 can be fully impregnated with the board material processing composition through the holes 20. Instead, the holes 20 may be provided in a vertical grain face.

Figure 3:
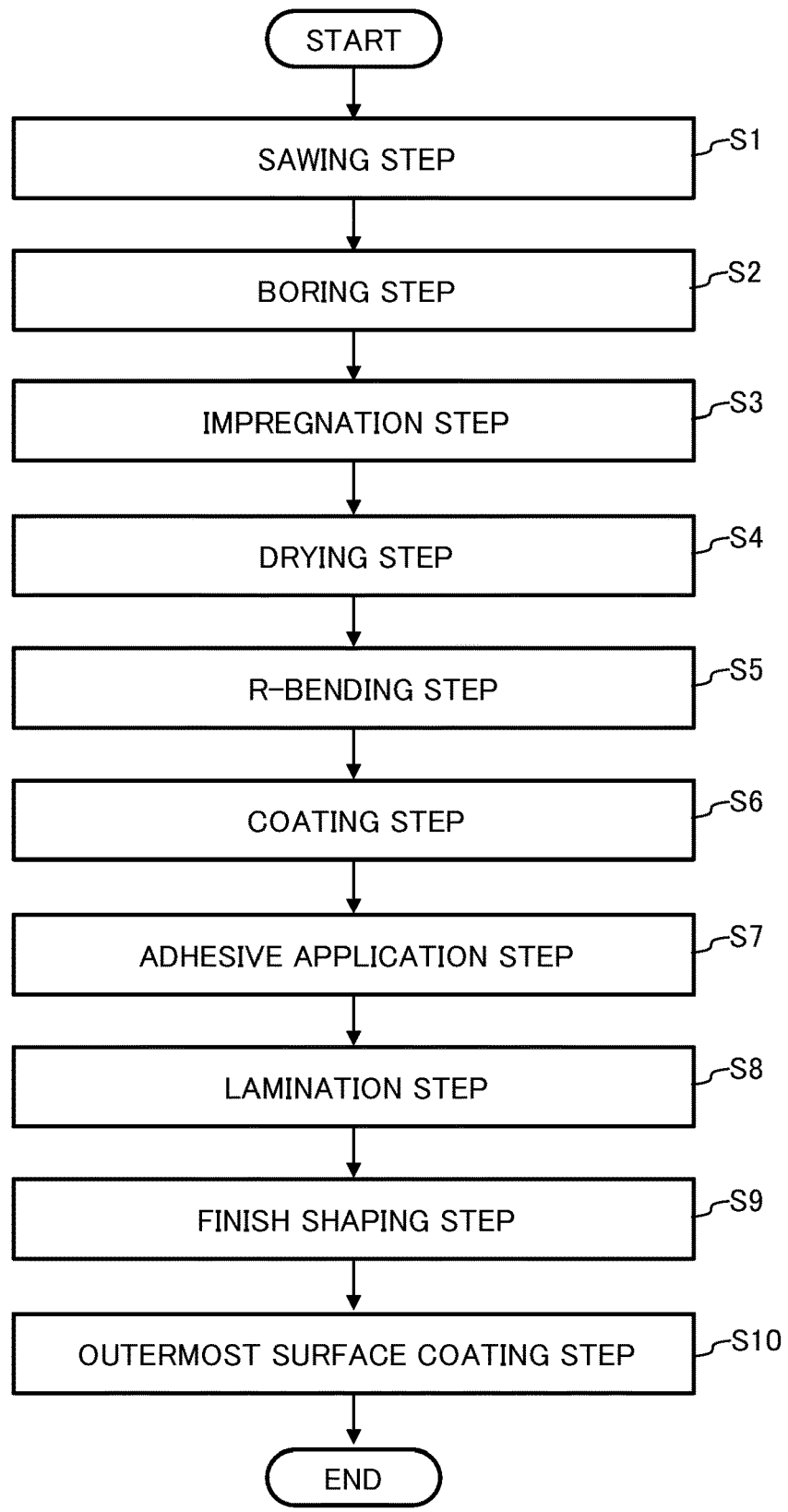
FIG. 3 is a flowchart illustrating a method for manufacturing the board material laminate of the present disclosure.

The holes 20 are formed so as to cut cellulose fibers of the board material 1 as wood. Shearing the fibers in such a manner makes it possible to extend, to the surrounding regions, the ability to be impregnated with the board material processing composition, thus facilitating impregnation. Furthermore, shearing the fibers inhibits deformation of the board material 1 due to stress included in the fibers after an impregnation step S3 (FIG. 3) and a drying step S4 (FIG. 3). The inner wall of each hole 20 is made of cellulose, lignin, and the like as constituent materials of the board material 1. Since the inner walls of the holes 20 are made of such materials, impregnation with the board material processing composition can be performed at the inner walls of the holes 20 in a similar manner to the other part.

Figure 4:
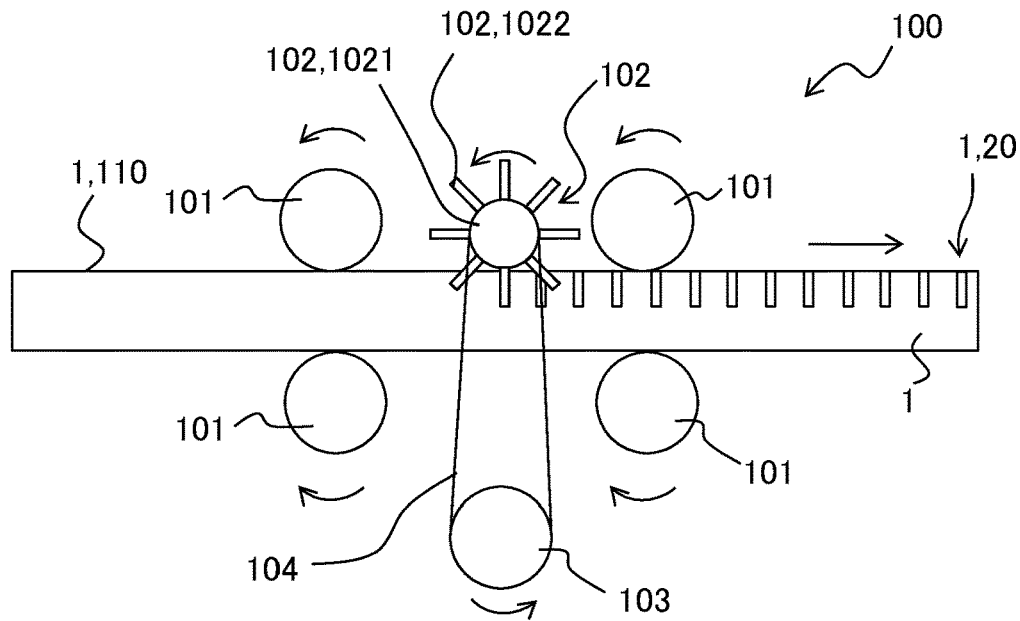
FIG. 4 is a schematic diagram of a boring apparatus executing a boring step.

The holes 20 extend along the thickness direction of the board material 1 as illustrated in FIG. 4 described later, for example. The holes 20 normally extend vertically to the surface of the board material 1. However, the holes 20 may be formed at an angle to the surface, for example. The holes 20 may be provided so as to pass through the board material 1 completely or may be provided in only a portion of the board material 1 in the thickness direction.

The depth of the holes 20 needs to be properly determined with consideration to the designability and work efficiency but is not particularly limited otherwise. The depth of the holes 20 may be, for example, 30% or more and preferably 40% or more of the thickness of the board material 1. As the upper limit, the depth of the holes 20 may be, for example, 100% or less, preferably 90% or less, and more preferably 70% or less of the thickness of the board material 1. In the case of 100%, the holes 20 pass through the board material 1 completely. When the holes 20 are formed in two surfaces opposite to each other, it is preferable that the sum of the depths of the holes 20 satisfy the aforementioned range.

When the board material 1 is thicker than 20 mm, for example, the depth of the holes 20 is preferably set to 5 mm to 15 mm, both inclusive (10 mm, for example) from the viewpoint of ensuring the strength of the board material 1.

When the holes 20 are provided in a flat grain face, the holes 20 preferably have such a depth as to pass through plural layers of latewood. Latewood part is hard and is difficult to impregnate with the board material processing composition. When the holes 20 pass through plural layers of latewood, the inside of the board material 1 can be fully impregnated with the board material processing composition.

The size (the maximum inner diameter, for example) of the holes 20 is, for example, 0.1 mm or more and preferably 0.3 mm or more. As the upper limit, the size of the holes 20 is, for example, 5 mm or less and preferably 3 mm or less. When the holes 20 are circular in a top view, for example, the size of the holes 20 corresponds to the diameter thereof. When multiple holes 20 are provided, the distance between any adjacent two of the holes 20 is not particularly limited but may be, for example, 5 mm or more, and preferably 10 mm or more. As the upper limit, the distance may be, for example, 20 mm or less and preferably 15 mm or less.

The board material processing composition includes a carbonization promotion component, a chain inhibition component, and binder particles. The carbonization promotion component, chain inhibition component, and binder particles are all inorganic. By virtue of being inorganic, these constituents are able to provide non-combustible properties, for example, to the board material 1.

The carbonization promotion component is a component that promotes carbonization of organic components of the board material 1 when the board material 1 is heated. By virtue of including the carbonization promotion component, the board material processing component carbonizes organic components, such as cellulose or lignin, in the heated surface to inhibit penetration of oxygen into the board material 1. This can inhibit combustion of organic components existing inside. Furthermore, carbide produced in the heated surface can inhibit heat transfer to the inside of the board material 1 and thereby inhibit combustion of organic components existing inside.

The form of the carbonization promotion component is not particularly limited but is preferably the form of particles, for example, that are insoluble or slightly soluble to water, for example. By virtue of being in the form of particles, the carbonization promotion component can easily disperse in the board material processing composition even when the particles are insoluble or slightly insoluble. The particle size of the carbonization promotion component in the form of particles is 10 μm to 50 μm, both inclusive, for example. When the particle size is in this range, the carbonization promotion component can easily penetrate into the board material 1. The particle size can be an average particle size based on the laser diffraction-scattering method, for example.

Specific ingredients of the carbonization promotion component are not particularly limited and can include at least any one of boron-based compounds (boric acid, for example), phosphor-based compounds (phosphoric acid, for example), and ammonium sulfate, for example. Among these, the carbonization promotion component preferably includes a boron-based compound and preferably includes boric acid in particular. Boron-based compounds are stable, inexpensive, and readily available, so that the manufacturing cost of the board material processing composition can be reduced.

The chain inhibition component is a component that inhibits a reaction chain to neighboring components by virtue of products of endothermic decomposition generated when the board material 1 is heated. The chain inhibition component can exert a cooling effect due to the chemical reaction of endothermic decomposition. Furthermore, the chain inhibition component is able to block a reaction chain by virtue of a non-contact effect due to the products, such as carbide, together with the aforementioned carbonization promotion component.

Specific ingredients of the chain inhibition component are not particularly limited and can include at least any one of ammonium dihydrogen phosphate (monoammonium phosphate), a guanidine compound, sodium polyborate, borax, and zinc borate, for example. Among these, a highly hydrophilic ingredient is preferred. The chain inhibition component preferably includes ammonium dihydrogen phosphate. Ammonium dihydrogen phosphate exhibits low moisture absorption. Ammonium dihydrogen phosphate therefore can reduce moisture absorption into the board material 1 when dispersed across the board material 1. This can inhibit delamination at the adhesion layers 13 due to internal moisture.

For example, the chain inhibition component and the aforementioned carbonization promotion component may include the same ingredient (boric acid, for example). That is, when the board material processing composition includes boric acid, for example, boric acid serves as the chain inhibition component and the carbonization promotion component.

The binder particles are a hydrophobic substance that bonds organic components (cellulose and the like) in the board material 1 to the carbonization promotion component or chain inhibition component. Since the board material processing composition includes the binder particles, the carbonization component and the chain inhibition component can be disposed in close contact to the organic components within the board material 1, thus making it difficult for the organic components to burn. Furthermore, the binder particles of hydrophobic can inhibit transfer of moisture to the wood, carbonization promotion component, and chain inhibition component originating from the binder particles, thus providing long-term adhesion therebetween.

The binder particles are preferably fine. Specifically, the size of the binder particles is 1 μm to 100 μm, both inclusive, for example. When the particle size is within this range, the binder particles can easily penetrate the board material 1. Furthermore, the biner particles having a particle size within this range can be stably disposed. The particle size can be an average particle size based on the laser diffraction-scattering method, for example. The binder particles do not necessarily have an equal particle size. The binder particles may be a powder mixture including particles having different particle sizes. When such a powder mixture is used, the binder particles can be disposed so as to fill gaps, thus further improving the adhesion performance. The binder particles may be either spherical or non-spherical. The non-spherical shapes may be angular (a shape including a corner), ellipsoidal, or the like, for example.

Specific constituents of the binder particles are not particularly limited and can include at least any one of inorganic materials insoluble or slightly soluble to water, such as silica sand, for example. The binder particles preferably include silica sand in particular. Using silica sand makes it difficult to retain moisture inside, thus inhibiting efflorescence after the board material 1 is impregnated with the board material processing composition and then dried. Furthermore, silica sand forms an inorganic thermal insulation layer, thus improving the non-combustibility.

The board material processing composition preferably includes ceramic particles (sintered products). Ceramic particles have a function of improving the non-combustibility of the board material laminate 10, for example. Sintered products have high thermal insulation performance, and ceramic particles therefore can inhibit propagation of heat. This can reduce the depth of burning. Whether or not the particles are ceramic particles can be determined by observation using an electronic microscope, a component analysis, or the like, for example.

The ceramic particles are preferably spherical. By virtue of being spherical, the ceramic particles easily enter the board material 1, thus easily penetrating the board material 1. Furthermore, by virtues of being spherical, the ceramic particles can have a higher bulk density than that of non-spherical particles (bulky particles, for example), and the thermal insulation effect attributable to the ceramic particles can be increased in particular. This can particularly enhance the non-combustibility of the board material 1. The spherical ceramic particles can be produced by melting and sintering, for example. The ceramic particles may be non-spherical, although preferably spherical.

When the board material processing composition includes the ceramic particles, at least some of the ceramic particles are preferably included in the board material 1 that is placed in an outermost layer. Even when a flame or the like comes into contact with the board material 1 placed in the outermost layer, for example, the board material 1 placed in the outermost layer is highly resistant to heat because of the heat resistance attributable to the ceramic particles. It is therefore possible to inhibit propagation of heat to the board materials 1 placed inside the board material 1 placed in the outermost layer, thus providing a thermal insulation effect. This can reduce the depth of burning. The non-combustibility of the entire board material laminate 10 can be thereby improved.

Specific ingredients of the ceramic particles are not particularly limited as long as the ingredients have such heat resistance properties as to be resistant to flames. The ceramic particles are at least one of sintered products composed of metal oxide, such as alumina or fluorite, sintered products composed of non-metal oxide, such as silica (silicon dioxide), silicon carbide, or silicon nitride, for example.

The size of the ceramic particles is not particularly limited and is, for example, 8 μm or more and preferably 10 μm or more. As the upper limit, the size of the ceramic particles is, for example, 35 μm or less and preferably 20 μm or less. When the particle size is within this range, the ceramic particles easily penetrate the board material 1. Disposing the ceramic particles within the board materials 1 through impregnation of the board material 1 in particular can strengthen the adhesion by the adhesion layers 13 (described later). The size of the ceramic particles can be measured by the same measuring method as that of the binder particles described above, for example.

The ceramic particles can be produced by blasting a block of ceramic (silica, for example), followed by heat treatment, for example. Whether or not the ceramic particles are spherical can be confirmed by observation using a microscope, for example.

When the board material processing composition includes the ceramic particles, the content of the ceramic particles may be 0.5% by mass to 5% by mass, both inclusive, with respect to the entire board material processing composition, for example. When the content of the ceramic particles is within this range, the board material 1 can be easily impregnated with the board material processing composition.

When the board material 1 is subjected to impregnation with the board material processing composition including the ceramic particles, the ceramic particles are disposed inside the board material 1 and near the surface thereof. When an adhesive (described later) is applied in this state, the adhesive also penetrates into the board material 1 but cannot penetrate through the ceramic particle portions in the board material 1, so that the adhesion strength can be intentionally reduced. When the board material 1 comes into contact with a flame, therefore, delamination can be intentionally caused to particularly improve the non-combustibility. This is described in detail with reference to Examples.

The board material processing composition may include any ingredient, in addition to the ingredients including the carbonization promotion component, chain inhibition component, and binder particles, without significantly diminishing the effect of the present disclosure. Furthermore, the concentration of the ingredients in a solvent (water, for example) is not particularly limited but may be, for example, 30% by mass to 40% by mass, both inclusive. In addition, the relative content ratio between the carbonization promotion component, chain inhibition component, and binder particles is not particularly limited. For 1% by mass of the carbonization promotion component, for example, the chain inhibition component at a ratio of, for example, 5% by mass to 15% by mass, both inclusive, and the binder particles at a ratio of, for example, 1% by mass to 10% by mass, both inclusive, may be used.

The board material processing composition is an impregnation agent for the board material 1, for example. When the board material processing composition is an impregnation agent, the board material processing composition is able to provide non-combustibility for the entire board material 1. A specific impregnation method is described later with reference to FIG. 3.

The board material processing composition can be used as a coating agent for the surface of the board material 1, too. When the board material processing composition is a coating agent, the board material processing composition can inhibit combustion inside the board material 1 when the surface thereof is heated and implement reduction in weight of the board material 1 because the board material 1 is not entirely impregnated. A specific coating method is described later with reference to FIG. 3.

The thicknesses of the first and second board materials 11 and 12 are independently, for example, 1 mm or more and preferably 3 mm or more. As the upper limit, the thickness of each of the first and second board materials 11 and 12 is, for example, 15 mm or less, preferably 10 mm or less, and more preferably 9 mm or less. When the thicknesses are each within the above range, the first and second board materials 11 and 12 can be easily and entirely impregnated with the board material processing composition.

The adhesion layers 13 are configured to bond the first board materials 11 and the second board materials 12. The adhesion layer 13 is formed by applying any adhesive to at least any one of the first board materials 11 and the second board materials 12 and bonding the first and second board materials 11 and 12 to each other. Such an adhesive includes an adhesive capable of gluing wood to wood. Specifically, the adhesive can be an adhesive mainly composed of an adhesive component, such as isocyanates, polyvinyl acetate resins, resorcinol resins, melamine resins, or urea resins, for example.

In addition to the aforementioned adhesive component, the adhesion layers 13 may include any component, such as the aforementioned ceramic particles or silica sand, for example, without significantly diminishing the effect of the present disclosure. When the adhesion layers 13 include an ingredient such as ceramic particles, the adhesion layers 13 are preferably derived from a one-part adhesive in terms of hardening promotion.

The thickness of the adhesion layer 13 is not particularly limited but may be, for example, 1 μm to 1 mm, both inclusive, preferably 1 μm to 100 μm, both inclusive, and more preferably 1 μm to 15 μm, both inclusive. Usually, the adhesion layer 13 is thicker than the size of the ingredients, including ceramic particles.

The adhesion layers 13 can include ceramic particles similar to the aforementioned ceramic particles. Preferably, at least any one of the adhesion layers 13 and the aforementioned board material processing composition include ceramic particles. When the adhesion layers 13 include ceramic particles, the non-combustibility of the board material laminate 10 can be improved in a similar manner to the case where the board material processing composition includes ceramic particles. When the ceramic particles are included in the adhesion layers 13 adjacent to the board materials 1 (the outermost board materials 1) placed in the outermost layers in particular, at combustion of the outermost board materials 1, the ceramic particles in the adhesion layers 13 inhibit propagation of heat to the adjacent board materials 1. This can reduce the depth of burning and inhibit combustion of the entire board material laminate 10, thus improving the non-combustibility of the entire board material laminate 10.

Furthermore, when the adhesion layers 13 include the ceramic particles, compared to the case where the adhesion layers 13 do not include the ceramic particles, the adhesive performance is intentionally inhibited without affecting long-term use because the ceramic particles are not involved in the adhesion function. When the board material 1 placed in one of the outermost layers burns, the board material 1 carbonized by burning is intentionally separated from the board material 1 that was bonded to the carbonized board material 1 with the adhesion layer 13 interposed therebetween. As a result, gap (void) formed between the carbonized board material 1 and the board material 1 that is located just inside the carbonized board material 1 and is not carbonized inhibits propagation of heat. It is therefore possible to inhibit any adjacent two of the board materials 1 from burning in succession, thus improving the non-combustibility of the entire board material laminate 10.

When the adhesion layers 13 include the ceramic particles, the specific ingredients and size of the included ceramic particles can be obtained by applying the matters concerning the specific ingredients and size of the aforementioned ceramic particles included in the board material processing composition. However, the content of the ceramic particles in each adhesion layer 13 may be, for example, 1% by mass or more and preferably 3% by mass or more with respect to the entire adhesion layer 13. As the upper limit, the content of the ceramic particles may be, for example, 15% by mass or less and preferably 12% by mass or less.

The ceramic particles may be included in underlying layers (not illustrated) of at least any one of the first board materials 11 and the second board materials 12, instead of or in addition to the adhesion layers 13. The underlying layer is formed in a surface of each of the board materials 1 including at least any one of the first board materials 11 and the second board materials 12 and is a part of each board material 1. When the underlying layers are formed, the adhesion layers 13 are bonded to the underlying layers within the first board materials 11 or the second board materials 12.

The board material laminate 10 includes surface coating layers 14 in surfaces of at least any one of the first board materials 11 and the second board materials 12. In the example illustrated in the FIG. 2, each of the first board materials 11 is provided with the surface coating layers 14 in the upper and lower surfaces, and each of the second board materials 12 is also provided with the surface coating layers 14 in the upper and lower surfaces. When the surface coating layers 14 are provided, the adhesion layers 13 can be bonded to at least any one of the first board materials 11 and the second board materials 12 by using the affinity between the adhesion layers 13 and the surface coating layers 14. The board material laminate 10 does not necessarily include the surface coating layers 14.

The surface coating layers 14 may include the aforementioned carbonization component, chain inhibition component, and binder particles, for example. Such a configuration facilitates exertion of high adhesion performance and non-combustibility against heating originating on surfaces of at least any one of the first board materials 11 and the second board materials 12. Furthermore, since the binder particles are hydrophobic, it is possible to inhibit moisture migration originating from the binder particles to the wood, carbonization promotion component, chain inhibition component, and adhesion layer 13. This can inhibit delamination between each surface coating layer 14 and the adhesion layer 13 and provide firm adhesion between the same over a long period of time. The concentrations of the carbonization promotion component, chain inhibition component, and binder particles in the surface coating layers 14 may be the same as or different from those of the aforementioned board material processing composition.

The surface coating layers 14 preferably include silica sand. By including silica sand, the surface coating layers 14 inhibit occurrence of efflorescence that is surface deposits of the board material processing composition with which the board material laminate 10 was impregnated, for example, after drying of the board material processing composition. Silica sand may be included as the binder particles or for another purpose.

The surface coating layers 14 may further include any additives. The any additives include at least any one of a wax component, a pigment, an antimicrobial agent (titanium oxide, or the like), or the like, for example.

The thickness of the surface coating layer 14 is not particularly limited but may be, for example, 1 μm to 1 mm, both inclusive, preferably 1 μm to 100 μm, both inclusive, and more preferably 1 μm to 15 μm, both inclusive.

The board material laminate 10 includes an outermost surface coating layer 15 at outermost surfaces 2. Including the outermost surface coating layer 15 improves the functionality of the outermost surface 2. The outermost surface coating layer 15 is not necessarily provided.

The outermost surface coating layer 15 preferably includes an inorganic additive including at least any one of a pigment, an antimicrobial agent, an antiviral agent, or a water-repellent agent. This can improve functions of the outermost surface 2, including the designability, antimicrobial property, antiviral property, water repellency, of the like. When the outermost surface coating layer 15 includes a pigment, for example, the outermost surface 2 of the board material laminate 10 can be colored. Furthermore, providing the outermost surface coating layer 15 that includes a pigment and is transparent, unlike applying a paint, allows the user to observe a wood grain pattern of the outermost surface 2, thus improving the designability.

Normally, the outermost surface coating layer 15 is more likely to be exposed to air or touched by people. When the outermost surface coating layer 15 includes at least any one of an inorganic antimicrobial agent, an inorganic antiviral agent, or an inorganic water-repellent agent, it is possible to provide non-combustibility for the board material laminate 10 and provide at least any one of the antimicrobial property, antiviral property, or water-repellency for the board material laminate 10. Providing the antimicrobial property for the outermost surface 2 in particular can inhibit intrusion of bacteria or the like into the board materials 1 from the outermost surface 2, thus inhibiting decay inside. Furthermore, providing the water-repellency for the outermost surface 2 can inhibit intrusion of moisture into the board materials 1 from the outermost surface 2, thus inhibiting decay inside.

Specific ingredients of the antimicrobial agent, antiviral agent, and water-repellent agent are not particularly limited. The antimicrobial and antiviral agents include an inorganic ingredient having preservative and anti-termite properties, for example, and specific examples thereof are boric acid and phosphoric acid. The antimicrobial and antiviral agents can include ingredients, like titanium oxide, for example, exerting an antimicrobial action by ions. Use of such an ingredient allows for long-term use of the board material laminate 10 even outdoors or on the earth. Furthermore, examples of the water-repellent agent are silicon compounds, such as silica, organosiloxane, or silane.

The outermost surface coating layer 15 is preferably composed of an inorganic material. This can inhibit deterioration of the outermost surface coating layer 15 due to light even when the outermost surface coating layer 15 is irradiated with light including ultraviolet, such as sunlight.

The outermost surface coating layer 15 may serve as the surface coating layer 14 as illustrated in FIG. 2. To be specific, in the outer side of the board material 1 placed in the outermost layer in the board material laminate 10, a layer serving as the surface coating layer 14 and the outermost surface coating layer 15 is formed. The aforementioned matters concerning the surface coating layers 14 can be similarly applied to the outermost surface coating layer 15. For example, the outermost surface coating layer 15 may include the aforementioned carbonization promotion component, chain inhibition component, and binder particles. In addition to the effects described concerning the surface coating layers 14, since the outermost surface coating layer 15 is composed of an inorganic material, it is possible to easily erase oil-based ink sticking to the outermost surface coating layer 15, for example.

The thickness of the outermost surface coating layer 15 is not particularly limited but may be, for example, 1 μm to 1 mm, both inclusive, preferably 1 μm to 100 μm, both inclusive, and more preferably 1 μm to 15 μm, both inclusive.

The board material laminate 10 can be used in any applications. For example, by laminating plural thin board materials 1, the board material laminate 10 can be thick plywood (for example, 10 to 50 mm, or can be thicker) having a thickness and a non-combustibility that cannot be implemented with the single board material 1. For example, the board material laminate 10 produced by laminating ten 5 mm-thick board materials 1 impregnated with the board material processing composition is 50 mm thick and is excellent in non-combustibility. The board material laminate 10 is particularly excellent in adhesion performance between the board materials 1 and can be stably used for a long period of time without suffering much delamination. This is described in detail later with reference to Examples.

In addition, the board material laminate 10 can be used in any applications, such as CLT, wood powder/wood wool boards, gypsum boards, concrete portions, steel-made portions, paper products, fabric products, vinyl sheet products, and surface veneers (hardwood, softwood). Furthermore, existing certified non-combustible materials (either veneer or plywood) can be used as the board material laminate 10 by applying the board material processing composition according to the present disclosure thereto. That is, the board material laminate 10 of the present disclosure can be produced by using an existing board material laminate and the board material processing composition of the present disclosure, instead of being produced from new wood.

The board materials 1 constituting the board material laminate 10 are impregnated with the board material processing composition as described above and do not include much residual moisture. This can provide sufficient non-combustibility and improve the adhesion performance due to the adhesion layers 13 while inhibiting the efflorescence phenomenon over a long period of time. Furthermore, each board material 1 is configured to have such a thickness that residual moisture inside (internal moisture) is equally distributed regardless of location. The residual moisture is thereby equally distributed across the board material laminate 10. This can inhibit uneven deformation due to differences in moisture content, thus inhibiting cracks or the like.

FIG. 3 is a flowchart illustrating a method of manufacturing the board material laminate 10 (FIG. 1) of the present disclosure. The method of manufacturing the board material laminate 10 includes a sawing step S1, a boring step S2, an impregnation step S3, a drying step S4, an R-bending step S5, a coating step S6, an adhesive application step S7, a lamination step S8, and a finish shaping step S9, and an outermost surface coating step S10. The boring step S2 is preferably performed but is not necessarily provided.

The sawing step S1 is a step of sawing wood into the board materials 1 (FIG. 1) that are flat, for example, and have a thickness of 1 mm to 15 mm, both inclusive, for example. The type of wood is not limited and can be cedar, cypress, or the like, for example. The sawing method is not particularly limited but preferably uses wood harvested in winter in terms of reducing internal moisture of the board materials 1, for example. However, internal moisture of wood harvested in summer can be reduced enough when the board materials 1 are made thin.

FIG. 4 is a schematic diagram of a boring apparatus 100 executing the boring step S2. The boring step S2 is a step of forming the holes 20 in a surface 110 of each of the board materials 1 including at least any one of the first board materials 11 (FIG. 1) and the second board materials 12 (FIG. 1). The holes 20 are formed by forcing the tip of a rod member 1022 into the surface 110. The boring apparatus 100 is an apparatus forming the holes 20 in the surface 110 of the board material 1. The surface 110 where the holes 20 are formed is preferably a flat-grain surface in the board material 1 as described above.

The boring apparatus 100 includes a conveyance roller 101, a scratching roller 102, and a driving roller 103. The conveyance roller 101 includes plural conveyance rollers 101, for example, to convey the board material 1. In the example illustrated in FIG. 4, the board material 1 is placed between two of the conveyance rollers 101 that are vertically arranged. The example illustrated in FIG. 4 includes two pairs of the conveyance rollers 101 sandwiching the board material 1, the pairs being arranged in the left-right direction. The upper conveyance roller 101 and the lower conveyance roller 101 in each pair rotate in opposite directions to convey the board material 1 sandwiched by the upper and lower conveyance rollers 101.

The scratching roller 102 faces the surface 110 and rotates while scratching the surface 110 to form the holes 20 in the surface 110. The scratching roller 102 includes a rotation shaft 1021 and the rod member 1022, which extends outward (radially, for example) from the surface of the rotation shaft 1021.

The rotation shaft 1021 is cylindrical, for example, and is coupled through a belt 104, to the driving roller 103, which is coupled to a motor (not illustrated). When the driving roller 103 rotates, the rotation force of the driving roller 103 is transmitted to the rotation shaft 1021 through the belt 104, which is wound around the driving roller 103. The rotation shaft 1021 thereby rotates.

The rod member 1022 includes plural rod members 1022, for example, which are arranged in the surface of the rotation shaft 1021 at intervals corresponding to intervals (interval L3 described later (FIG. 5)) at which the holes 20 are formed. Each rod member 1022 may have a pillar-like shape, such as a cylinder or a polygonal pillar, that has a certain thickness when viewed with the naked eye, or may have a pyramid-like shape, such as a cone or a polygonal pyramid. Each rod member 1022 may have, for example, a needle shape having a certain thickness that can be visually recognized when checked by, for example, a microscope. The tips of the rod members 1022 are forced into (dig into) the surface 110 of the board material 1 to form the holes 20 in the surface 110. Since the holes 20 are formed by forcing the rod members 1022 into the board material 1 in such a manner, the holes 20 can be formed without significantly diminishing the properties of the board material 1 as wood. This facilitates controlling impregnation with the board material processing composition through the holes 20, thus facilitating impregnation of the entire board material 1 with the board material processing composition.

The shape of the rod members 1022 may be determined corresponding to the desired shape of the holes 20. When the inner wall surface of each hole 20 is configured to have the lateral surface of a cylinder, each rod member 1022 is composed of a cylinder, for example. The tips of the rod members 1022 may be pointed so as to be easily forced into the board material 1. By changing the distance between the scratching roller 102 and the surface 110, the depth by which the rod members 1022 are forced into the board material 1 can be changed, so that the depth of the holes 20 can be changed.

Back to FIG. 3, the impregnation step S3 is a step of impregnating each board material 1 with the board material processing composition. When the holes 20 are formed in the board material 1, the board material 1 with the holes 20 (FIG. 4) formed therein is impregnated with the board material processing composition. The board material processing composition penetrates the entire board material 1, for example, through the holes 20. The board material processing composition is normally slurry including water as a solvent.

The specific method of impregnation is not particularly limited. For example, the board material 1 is loaded into a vessel (not illustrated) that can be pressurized and depressurized. The vessel is then depressurized to reduce internal moisture of the board material 1. Next, slurry of the board material processing composition is transferred to the vessel under the reduced pressure, followed by appropriately pressurization and the like. The board material 1 is thus impregnated with the board material processing composition. The pressurization may be pressurization from the reduced pressure back to the atmospheric pressure or from the reduced pressure to a pressure higher than the atmospheric pressure. The specific conditions for impregnation are not particularly limited but are preferably conditions that allow the inside of the board material 1 to be fully impregnated. Specifically, when the thickness of the board material 1 is set to 1 mm to 10 mm, both inclusive, as described above, for example, the board material 1 can be evenly impregnated, thus inhibiting uneven impregnation.

The board material processing composition may include the aforementioned ceramic particles. By impregnation of the board material 1 with the board material processing composition, the ceramic particles can be disposed (fixed) within the board materials 1. When the board material processing composition includes the ceramic particles, the board material 1 is preferably impregnated with the board material processing composition to such an extent that the ceramic particles cannot remain on the surface of the board material 1 in the drying step S4 and subsequent steps described later. This can inhibit unintentional reduction in adhesion strength by the adhesive. To inhibit the ceramic particles from remaining on the surface, for example, impregnation may be performed using an excessive amount of the board material processing composition, followed by removal of the ceramic particles remaining on the surface of the board material 1. Alternatively, impregnation may be performed by, for example, applying the board material processing composition at a certain concentration on the surface of the board material 1 for a certain number of times. The concentration and the number of times are determined such that the ceramic particles not remain on the surface.

The drying step S4 is a step of drying the board material 1 impregnated with the board-material processing composition. By the drying process, the slurry of the board material processing composition remaining within the holes 20 is also dried, and the holes 20 are filled with solid. The specific conditions of the drying process are not particularly limited. For example, the board material 1 can be dried by appropriately heating, depressurization, and the like within the vessel. The drying process causes the board material processing composition to be fixed within the board material 1.

The R-processing step S5 is a step of performing R-processing (R-bendig) for each dried board material 1 to make the board material 1 curved. The specific method of R-processing is not particularly limited. The board material 1 can be bent into a desired shape by being subjected to R-processing using a jig (not illustrated). The R-processing step S5 is not essential. The flat board material 1 may be directly used without being subjected to the R-processing step S5 according to the product's specifications. The R-processing step S5 may be performed before the drying step S4.

The coating step S6 is a step of forming the surface coating layers 14 (FIG. 2) in the surface of each board material 1 with the board material processing composition fixed inside. The method of forming the surface coating layers 14 is not particularly limited. For example, the surface coating layers 14 can be formed by applying to the board material 1, a dispersion liquid (or slurry) in which the ingredients described above concerning the surface coating layers 14 are dispersed in any solvent (water, for example) and then vaporizing the solvent. The coating step S6 is not necessarily performed depending on the product's specifications.

By performing the coating step S6, bores (not illustrated) that might remain in the surface of the board material 1 can be filled with the dispersion liquid. This further inhibits moisture absorption and improves the adhesion performance in the lamination step S8 described later.

When the coating step S6 is performed using the board material processing composition including the ceramic particles, the board material 1 is preferably coated with the board material processing composition to such an extent that the ceramic particles cannot remain on the surface of the board material 1 in the adhesive application step S7 (described later), in a similar manner to the description of the impregnation step S3.

The adhesive application step S7 is a step of applying an adhesive to the surfaces where the surface coating layers 14 are formed. When the coating step S6 is not performed, the adhesive is applied to the surfaces that were subjected to the drying step S4 or the R-processing step S5. The adhesive is not necessarily applied to both surfaces of each board material 1. In adjacent two of the board materials 1 in the later described lamination step S8, the adhesive needs to be applied to the surface of at least any one of the two board materials 1 that faces the other board material 1. The type of the adhesive used in this step is not particularly limited but may be the adhesive described concerning the aforementioned adhesion layers 13 (FIG. 2).

The lamination step S8 is a step of appropriately laminating the board materials 1 (FIG. 2) with the surface coating layers 14 formed therein. In the lamination step S8, first, at least two of the board materials 1 are laminated on surface of each other so as to sandwich the adhesive applied in the adhesive application step S7. In a similar manner, the board materials 1 are laminated and are subjected to appropriately heating, pressurization, or the like for solidification of the adhesive, so that a desired number of board materials 1 are laminated. This forms the board material laminate 10 with the first board materials 11 and the second board materials 12 laminated with the adhesion layers 13 interposed therebetween, as illustrated in FIG. 2.

The finish shaping step S9 is a step of processing the board material laminate 10 produced in the lamination step S8 into a final finished shape. The specific processing method is not particularly limited and can employ any process. The finish shaping step S9 is performed or not necessarily performed, depending on the product's specifications.

The outermost surface coating step S10 is a step of forming the outermost surface coating layer 15 (FIG. 2) in at least any one (preferably both) of the outermost surfaces 2 (FIG. 2) of the board material laminate 10 processed into the finished shape. The method of forming the outermost surface coating layer 15 is not particularly limited. For example, the outermost surface coating layer 15 can be formed by applying a dispersion liquid (or slurry) in which the ingredients described above concerning the outermost surface coating layer 15 are dispersed in any solvent (water, for example) and then vaporizing the solvent. The outermost surface coating step S10 is performed or not necessarily performed, depending on the product's specifications.

By performing the outermost surface coating step S10, the holes 20 that might remain in the surface of the board material 1 can be filled with the dispersion liquid, thus further inhibiting moisture absorption. When the dispersion liquid includes a pigment, for example, the outermost surface 2 (FIG. 2) can be colored. Furthermore, when the dispersion liquid includes an antimicrobial agent, an antiviral agent, or a water-repellent agent, for example, the board material laminate 10 can be resistant to outdoor weather. The outermost surfaces 2 may be further heat-treated for surface carbonization if necessary. This can further improve the designability, for example.

EXAMPLES

Hereinafter, the present disclosure is described more specifically with examples.
Immersion Delamination Test and Boiling Water Soak Delamination Test Example 1

A 35% by mass slurry dispersion liquid (the board material processing composition) was prepared by weighing boric acid (the carbonization promotion component), ammonium dihydrogen phosphate (the chain inhibition component), and silica sand (the binder particles as a powder mixture with particle sizes of between 5 to 95 μm, non-spherical unsintered silicon dioxide) at a mass ratio of 1/6/2 and using water as a solvent.

Laminated wood including cedar and cypress harvested in winter was cut into boards with a width of 100 mm, a length of 100 mm, and a thickness of 15 mm, thus preparing the board materials 1 (FIG. 1). The prepared board materials 1 included at least two board materials 1. In Example 1, the boring step S2 (FIG. 3) was not performed. Each of the prepared board materials 1 was fully impregnated with the aforementioned dispersion liquid and then dried, so that the board material processing composition was fixed within the board material 1. After the board material processing composition was fixed, the dispersion liquid was applied to the surfaces of each board material 1 to which the adhesive was to be applied and was then dried for vaporization of the solvent. On the respective surfaces of each board material 1, the surface coating layers 14 (FIG. 2) with a thickness of 10 μm were formed.

On one of the surface coating layers 14 of each board material 1, an adhesive (SHIKAJIRUSHI PI BOND 6000 by Oshika Corporation, mainly composed of an aqueous polymer isocyanate) was applied. The two board materials 1 were laminated on surface of each other, and the adhesive was solidified, thus preparing the board material laminate 10 (FIG. 2) composed of the first board material 11 (FIG. 2) and the second board material 12 (FIG. 2) laminated with the adhesion layer 13 (FIG. 2) having a thickness of 10 μm interposed therebetween. The prepared board material laminate 10 was used for a non-combustibility test, an immersion delamination test, and a boiling water soak delamination test.

The non-combustibility test was performed for the board material laminate 10 that was appropriately shaped, according to the method described in "Fire Preventive and Fireproof Performance Test and Evaluation Procedure Manual" issued by Japan Testing Center for Construction Materials. The results revealed that the prepared board material laminate 10 was non-combustible. This is considered to be because not only the carbonization promotion component and chain inhibition component but also silica sand as the binder particles formed an inorganic thermal insulation layer, so that the board material laminate 10 was able to exert non-combustibility.

The immersion delamination test was performed as follows. The prepared board material laminate 10 was immersed in water at a temperature of between 10 to 20° C. for 6 hours and was then dried at a temperature of between 10 to 20° C. for 18 hours, thus completing a single cycle. The immersion delamination test was executed in two cycles in total. After the two cycles, visual check was performed for laminate part between the first board material 11, the adhesion layer 13, and the second board material 12. The results revealed no observable delamination between the first board material 11 and the adhesion layer 13 and between the second board material 12 and the adhesion layer 13. This confirmed that the first and second board materials 11 and 12 had high adhesive ability.

The boiling water soak delamination test was performed as follows. The prepared board material laminate 10 was immersed in boiling water at a temperature of 100° C. for 4 hours and was dried at a temperature of 10 to 20° C. for 6 hours. After the drying process, visual check was performed for the laminate part between the first board material 11, the adhesion layer 13, and the second board material 12. The results revealed no observable delamination between the first board material 11 and the adhesion layer 13 and between the second board material 12 and the adhesion layer 13. This confirmed that the first and second board materials 11 and 12 retained high adhesive ability even when exposed to more severe conditions than in the immersion delamination test.

As described above, no delamination was observed in both the immersion delamination test and the boiling water soak delamination test. The board material laminate 10 is therefore considered highly reliable with delamination inhibited over a long period of time of normal use, such as use at room temperature, in air, for example.

The reason for the above results is considered to be attributable to the hydrophobic binder particles (silica sand) as follows. The hydrophobic binder particles hardly retained moisture. Therefore wood as an organic substance and the carbonization promotion component and chain inhibition component were bonded to each other with the binder particles which are hardly retaining moisture. Moisture therefore hardly penetrated inside, thus inhibiting delamination due to internal moisture. Furthermore, the hydrophobic binder particles were able to firmly bond the wood, the carbonization component, the chain inhibition component, and the adhesion layers 13. This inhibited formation of gap and thereby inhibited delamination due to intrusion of water into gap, thus giving the excellent results in both the immersion delamination test and the boiling water soak delamination test.

Example 2

The board material laminate 10 was prepared in a similar manner to Example 1 excepting that the surface coating layers 14 were not formed. The board material laminate 10 was subjected to the non-combustibility test, the immersion delamination test, and the boiling water soak delamination test. The results revealed that the prepared board material laminate 10 was non-combustible. Furthermore, no delamination was observed in both the immersion delamination test and the boiling water soak delamination test. This confirmed that the first board material 11 and second board material 12 had high adhesive ability in a similar manner to Example 1.

Comparative Example 1

The board material laminate 10 was prepared in a similar manner to Example 1 excepting that silica sand (the binder particles) was not used. The board material laminate 10 was subjected to the non-combustibility test, the immersion delamination test, and the boiling water soak delamination test. The result revealed that the prepared board material laminate 10 was non-combustible. However, large delamination exceeding 10 mm was observed in both the immersion delamination test and the boiling water soak delamination test. This revealed that the first and second board materials 11 and 12 had low adhesive ability. This is considered to be because the carbonization promotion component and chain inhibition component absorbed moisture and the internal moisture caused the delamination. Furthermore, the carbonization promotion component and the chain inhibition component were bonded with small adhesive force, so that gap was more likely to be formed therebetween. Moisture therefore easily intruded into gap, and the moisture in gap further caused delamination.

Impregnation Evaluation Concerning Presence of Boring Step S2

Example 3

Figure 5:
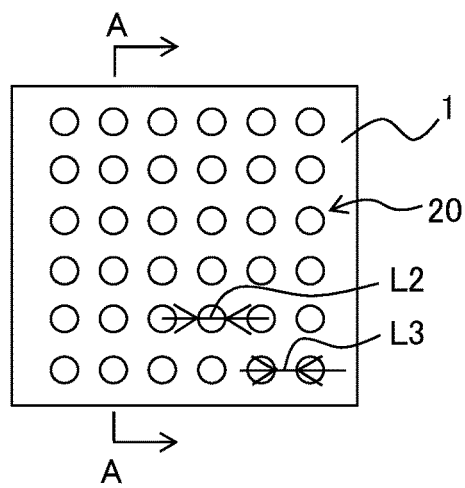
FIG. 5 is a top view of a board material used in Example 3.
Figure 6:
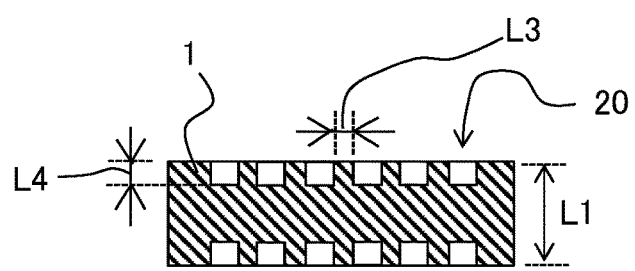
FIG. 6 is an A-A cross-sectional view of FIG. 5.

FIG. 5 is a top view of the board material 1 used in Example 3. FIG. 6 is an A-A cross-sectional view of FIG. 5. The board material 1 illustrated in FIGS. 5 and 6 was prepared by the boring step S2 (FIG. 3) using the rod members 1022 (FIG. 4). The holes 20 were formed at regular intervals and were of the same shape. Thickness L1 of the board material 1 was 20 mm. The holes 20 were circular in a top view and were formed in each surface of the board material 1. Size (diameter) L2 of the holes 20 was 0.5 to 1 mm, the interval L3 between any adjacent two of the holes 20 was 10 mm, and depth L4 of the holes 20 was 3 mm. The depth of each hole 20 was 15% of the thickness of the board material 1. Since the holes 20 were formed in each of the two surfaces 110, the total depth of the holes 20 was 30% of the thickness of the board material 1. The mass of the prepared board material 1 was then measured.

The board material 1 including the holes 20 was immersed in the board material processing composition of Example 1 and was boiled for 2 hours. After the elapse of 2 hours, the board material 1 was taken out and naturally cooled to 20° C., followed by washing with water. After washing with water, the board material 1 was dried fully and was measured in mass. The mass of the board material 1 before boiling was subtracted from the mass after boiling to determine the mass of the board material processing composition with which the board material 1 was impregnated. The aforementioned operation was performed 4 times in total.

Example 4

The mass of the board material processing composition was determined in a similar manner to Example 3 except that the board material 1 did not include the holes 20.

<Evaluation Result>

The results of Examples 3 and 4 are presented in Table 1 below.

[Table 1]

TABLE 1

|  | Before Boiling (kg) | After Boiling (kg) | Amount of Impregnation (kg) |
|---|---|---|---|
| Example 3 | 0.875 | 2.145 | 1.270 |
|  | 0.890 | 2.255 | 1.365 |
|  | 1.320 | 2.695 | 1.375 |
|  | 1.165 | 2.545 | 1.380 |
| Example 4 | 1.100 | 1.210 | 0.110 |
|  | 1.465 | 1.580 | 0.115 |
|  | 1.505 | 1.620 | 0.115 |
|  | 0.985 | 1.230 | 0.245 |

As presented in Table 1, the amount of impregnation was significantly increased by the holes 20 being provided. This means that the holes 20 can provide some advantages, such as shortening the time for impregnation or eliminating the need to apply pressure for impregnation, for example. Furthermore, since the holes 20 facilitate impregnation of the board material 1, the inside of the board material 1 can be fully impregnated even when the board material 1 is thick. The board material laminate 10, which includes a plurality of the board materials 1, therefore can be further increased in thickness and can be used in further various applications. That is, the board material processing composition of the present disclosure can be used for the board material laminate 10 and also used for a single-layer board material 1 without lamination.

Non-combustibility Evaluation and Delamination Evaluation concerning Presence of Ceramic Particles Example 5

The board material processing composition of Example 5 was prepared by adding ceramic particles to the board material processing composition of Example 1. The ceramic particles were silica particles (a sintered product of silicon dioxide) that were spherical and had a diameter of 8 μm (the average particle size based on the laser diffraction-scattering method). The amount of ceramic particles added was 1% by mass of the board material processing composition.

The board material processing composition of Example 5 was applied once to the surface of the board material 1 and was dried. By the application process, the board material processing composition penetrated into the board material 1, and by the drying process, a thin film with a thickness of 0.1 µm was formed on the surface. Since the thickness of the thin film was smaller than the size of the ceramic particles, the ceramic particles were considered to penetrate into the board material 1. The board material laminate 10 of Example 5 was prepared by applying the adhesive used in Example 1 to the surface of the thin film and then performing the same processing as that of Example 1. In Example 5, the board material laminate 10 was prepared using three board materials 1. Two of the board materials 1 in the outermost layers were bonded to the board material 1 in the middle with the underlying layers and adhesion layers 13 interposed therebetween.

The board material laminates 10 of Example 5 and Example 1 (described above and did not use the ceramic particles) as a reference example were subjected to the non-combustibility test and the delamination tests (the immersion delamination test and boiling water soak delamination test). The results are presented in FIGS. 7 and 8.

Figure 7:
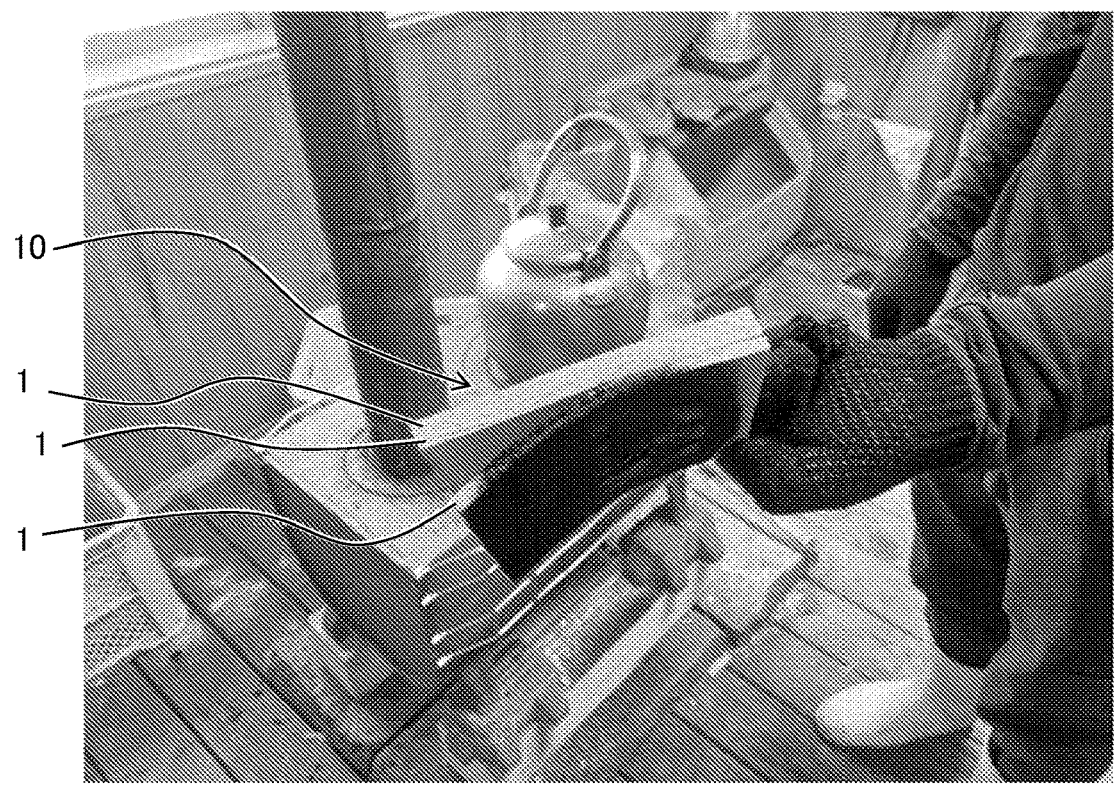
FIG. 7 is a drawing-substitute photograph presenting a result of a non-combustibility test concerning Example 5.

FIG. 7 is a drawing-substitute photograph presenting the result of the non-combustibility test concerning Example 5. As presented in FIG. 7, the board material 1 (in the photograph, the board material 1 at the bottom including a blackened portion (a carbonized portion)), among the three board materials 1, that came into contact with a flame separated from the other two board materials 1, limiting carbonization within only the board material 1 provided in the outermost layer. This is considered to be because the board material 1 that came into contact with a flame separated from the other two board materials 1 to form gap and because of the gap, heat is hardly transferred to the other two board materials 1. The other two board materials 1 were therefore not carbonized.

The separated board material 1 experienced warping but did not suffer significant damage, including perforation, breakage, collapse, or the like. None of the board materials 1 burned nor produce harmful gases or the like during the test. This confirmed that the board material laminate 10 of Example 5 was non-combustible. Furthermore, with consideration to the entire board material laminate 10, the board materials 1 that did not experience carbonization or warping can be considered as a base material while the board material 1 that experienced carbonization or warping can be considered as a superficial material. Given this perspective, the result also means that by virtue of carbonization and warping in only the superficial material, the base material was able to maintain its form without being carbonized or deformed.

Figure 8:
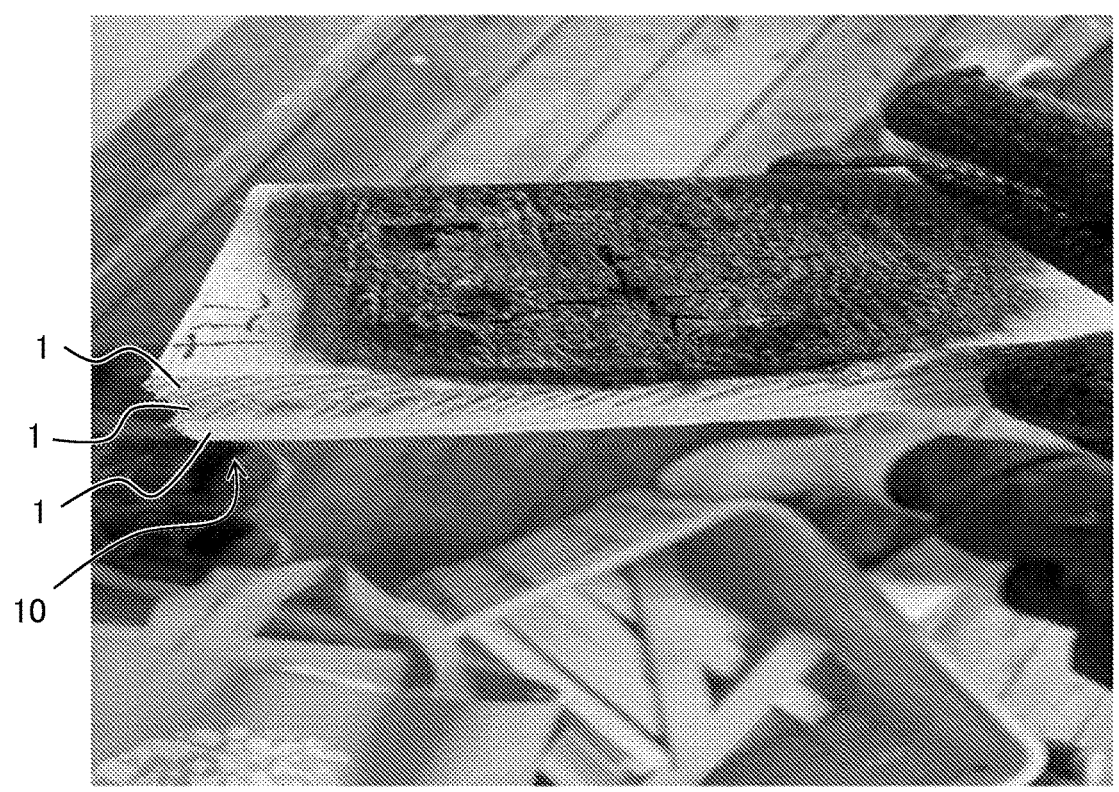
FIG. 8 is a drawing-substitute photograph presenting a result of the non-combustibility test concerning Reference Example (Example 1).

FIG. 8 is a drawing-substitute photograph presenting the result of the non-combustibility test concerning the reference example (Example 1). As presented in FIG. 8, the board materials 1 did not separate from each other in the board material laminate 10. In the photograph, blackened part (carbonized part) of the board material laminate 10 were expanded to the middle board material 1 in addition to the outermost board material 1 presented at the top in the photograph. Thus, carbonization progressed farther than in Example 5. This is considered to be because the board materials 1 were bonded to each other and carbonization progressed continuously. In the reference example, the board materials 1 did not suffer significant damage, including perforation, breakage, collapse, or the like. Since none of the board materials 1 burned nor produced harmful gases or the like during the test, it was confirmed that the board material laminate 10 of the reference example was non-combustible.

Neither of the board material laminates 10 of Example 5 nor the reference example (Example 1) suffered delamination of the board materials 1 (not illustrated). This reveals that the board material laminate 10 of Example 5 had a delamination resistance at least equal to that of the board material laminate 10 of the referential example and had a non-combustibility higher than the board material laminate 10 of the referential example. Whether to use the ceramic particles therefore can be determined depending on the intended use of the board material 1 or board material laminate 10, such as interior materials, exterior materials (used in a place requiring a scaffolding), structural materials, or superficial materials (for strictly ensuring the strength). According to the present disclosure, it is possible to provide an advantage that allows the user to select any manufacturing process.

REFERENCE SIGNS LIST

1 BOARD MATERIAL
10 BOARD MATERIAL LAMINATE
11 FIRST BOARD MATERIAL
12 SECOND BOARD MATERIAL
13 ADHESION LAYER
14 SURFACE COATING LAYER
15 OUTERMOST SURFACE COATING LAYER
2 OUTERMOST SURFACE
S1 SAWING STEP
S2 BORING STEP
S3 IMPREGNATION STEP
S4 DRYING STEP
S5 R-BENDING STEP
S6 COATING STEP
S7 ADHESIVE APPLICATION STEP
S8 LAMINATION STEP
S9 FINISH SHAPING STEP
S10 OUTERMOST SURFACE COATING STEP

The invention claimed is:

1. A board material processing composition inhibiting combustion of a board material due to heating, comprising:
a carbonization promotion component, being inorganic, promoting carbonization of an organic component within the board material at the heating;
a chain inhibition component, being inorganic, inhibiting a reaction chain to a neighboring component due to a product of endothermic decomposition generated at the heating; and
binder particles, being inorganic and hydrophobic, bonding the organic component within the board material to the carbonization promotion component and the chain inhibition component,
wherein
the carbonization promotion component includes boric acid,
the chain inhibition component includes ammonium dihydrogen phosphate,
the binder particles include silica sand, and
the binder particles have a particle size of 1 µm to 100 µm, both inclusive, and
the board material includes a bored hole in a surface of the board material, and the board material processing composition is impregnated in the bored hole.

2. The board material processing composition according to claim 1, wherein the carbonization promotion component has a particle size of 10 µm to 50 µm, both inclusive.

3. The board material processing composition according to claim 1, wherein the board material processing composition is an impregnation agent for the board material.

4. The board material processing composition according to claim 1, wherein the board material processing composition is a coating agent for a surface of the board material.

5. The board material processing composition according to claim 1, further comprising ceramic particles.

6. The board material processing composition according to claim 5, wherein the ceramic particles are spherical.

7. A board material laminate, comprising:
a first board material impregnated with the board material processing composition according to claim 1;
a second board material impregnated with the board material processing composition according to claim 1; and
an adhesion layer bonding the first board material and the second board material to each other.

8. The board material laminate according to claim 7, wherein the first board material and the second board material each have a thickness of 1 mm to 10 mm, both inclusive.

9. The board material laminate according to claim 7, comprising a surface coating layer on at least any one surface of the first board material and the second board material.

10. The board material laminate according to claim 9, wherein the surface coating layer includes the carbonization promotion component, the chain inhibition component, and the binder particles.

11. The board material laminate according to claim 9, wherein the surface coating layer includes silica sand.

12. The board material laminate according to claim 7, comprising an outermost surface coating layer on an outermost surface.

13. The board material laminate according to claim 12, wherein the outermost surface coating layer includes at least any one inorganic additive among a pigment, an antimicrobial agent, an antiviral agent, and a water-repellent agent.

14. A method for manufacturing a board material laminate including a first board material impregnated with a board material processing composition, a second board material impregnated with the board material processing composition, and an adhesion layer bonding the first board material and the second board material to each other, the method comprising:
a boring step of forming a hole by forcing a tip of a rod member into a surface of at least any one of the first board material and the second board material; and
an impregnation step of impregnating the board material with the hole formed, with the board material processing composition,
wherein the board material processing composition inhibits combustion of the first and second board materials due to heating and comprises
a carbonization promotion component, being inorganic, promoting carbonization of an organic component within the first and second board materials at the heating,
a chain inhibition component, being inorganic, inhibiting a reaction chain to a neighboring component due to a product of endothermic decomposition generated at the heating, and
binder particles, being inorganic and hydrophobic, bonding the organic component within the first and second board materials to the carbonization promotion component and the chain inhibition component,
and wherein the carbonization promotion component includes boric acid, the chain inhibition component includes ammonium dihydrogen phosphate, and the binder particles include silica sand.

15. A board material processing composition inhibiting combustion of a board material due to heating, comprising:
a carbonization promotion component, being inorganic, promoting carbonization of an organic component within the board material at the heating;
a chain inhibition component, being inorganic, inhibiting a reaction chain to a neighboring component due to a product of endothermic decomposition generated at the heating; and
binder particles, being inorganic and hydrophobic, bonding the organic component within the board material to the carbonization promotion component and the chain inhibition component,
wherein
the carbonization promotion component includes boric acid,
the chain inhibition component includes ammonium dihydrogen phosphate, and
the binder particles include silica sand,
the board material includes a bored hole in a surface of the board material, and
the board material processing composition is impregnated in the bored hole.

* * * * *